(12) United States Patent
Chen et al.

(10) Patent No.: US 6,899,192 B2
(45) Date of Patent: May 31, 2005

(54) DRIVE MECHANISM FOR USE IN A MAN-DRIVEN VEHICLE

(75) Inventors: Wei-Pin Chen, Chang Hua Hsien (TW); Erich A. T. Chang, Taichung (TW)

(73) Assignee: Ravor USA LLC, Cerritos, CA (US)

( * ) Notice: Subject to any disclaimer, the term of this patent is extended or adjusted under 35 U.S.C. 154(b) by 39 days.

(21) Appl. No.: 10/615,031

(22) Filed: Jul. 9, 2003

(65) Prior Publication Data

US 2004/0251068 A1  Dec. 16, 2004

(51) Int. Cl.[7] ............................................... B62M 7/10
(52) U.S. Cl. .................... 180/205; 180/65.1; 180/65.2; 280/212
(58) Field of Search .................... 280/14.21, 14.28, 280/87.041–87.043, 87.021, 87.03, 212; 180/65.1, 65.2, 6.5, 219–221, 227, 228, 205

(56) References Cited

U.S. PATENT DOCUMENTS

| | | | |
|---|---|---|---|
| 4,579,188 A | * | 4/1986 | Facer .......................... 180/211 |
| 4,759,418 A | * | 7/1988 | Goldenfeld et al. ........ 180/65.1 |
| 5,078,227 A | * | 1/1992 | Becker ......................... 180/221 |
| 5,113,959 A | * | 5/1992 | Mastov et al. ................. 180/11 |
| 5,495,904 A | * | 3/1996 | Zwaan et al. .................. 180/11 |
| 5,735,363 A | * | 4/1998 | Horovitz et al. ............. 180/205 |
| 5,843,535 A | * | 12/1998 | Dobson .................... 427/430.1 |

* cited by examiner

Primary Examiner—Lesley D. Morris
Assistant Examiner—L. Lum
(74) Attorney, Agent, or Firm—Browdy and Neimark, P.L.L.C.

(57) ABSTRACT

A drive mechanism for use in a man-driven vehicle having a front fork to which a wheel is rotatably connected includes a rack, a power drive and a quick-release lock. The rack is affixed to the front fork of the man-driven vehicle. The power drive has a transmission shaft pressable on a periphery of the wheel of the front fork, and a motor coupled to the transmission shaft for driving the transmission shaft to rotate. The quick-release lock is coupled between said power drive and said rack for locking said power drive and said rack together, thereby enabling the user to select the man power driving mode or motor driving mode.

8 Claims, 4 Drawing Sheets ns of the preferred embodiment of the present in an alternate form installed in a bicycle.

DRIVE MECHANISM FOR USE IN A MAN-DRIVEN VEHICLE

BACKGROUND OF THE INVENTION

1. Field of the Invention

The present invention relates generally to a man-driven vehicles such as kick scooters, bicycles, etc., and, more specifically, to a drive mechanism for use in a man-driven vehicle, which enables the user to select the man power driving mode or the motor driving mode as desired.

2. Description of the Related Art

A kick scooter or bicycle is driven to run by man power. To an old or weak person or a woman, it is heavy to ride a kick scooter or bicycle for a relatively longer distance. Therefore, there are man power-driven vehicle manufacturers adding a power drive to their man power-driven vehicles. The user can selectively drive the man power-driven vehicle either by man power or power drive. However, a power drive for this purpose is heavy and complicated. The user cannot load/unload the power drive by itself. If the user simply wishes to drive the man-driven vehicle by man power, the user must employ much effort to move the man-driven vehicle because of the heavy weight of the power drive is a big burden.

It is therefore desirable to provide a drive mechanism for use in a man-driven vehicle that eliminates the aforesaid drawback.

SUMMARY OF THE INVENTION

It is the primary objective of the present invention to provide a drive mechanism for use in a man-driven vehicle, which is quickly detachable.

It is another objective of the present invention to provide a drive mechanism, which is piratical for use in a man-driven vehicle, for enabling the user to select the driving mode between the man power driving mode and the battery-operated motor driving mode.

To achieve these objectives of the present invention, the drive mechanism for use in a man-driven vehicle having a front fork to which a wheel is rotatably connected comprising a rack, a power drive and a quick-release lock. The rack is affixed to the front fork of the man-driven vehicle. The power drive has a transmission shaft pressable on a periphery of the wheel of the front work, and a power source coupled to the transmission shaft for driving the transmission shaft to rotate. The quick-release lock is coupled between said power drive and said rack for locking said power drive and said rack together. By means of the quick-release lock, the user can lock/unlock the power drive. Therefore, the user can select to drive the man-driven vehicle by man power, or by means of the power source of the power drive.

DETAILED DESCRIPTION OF THE INVENTION

Figure 1:
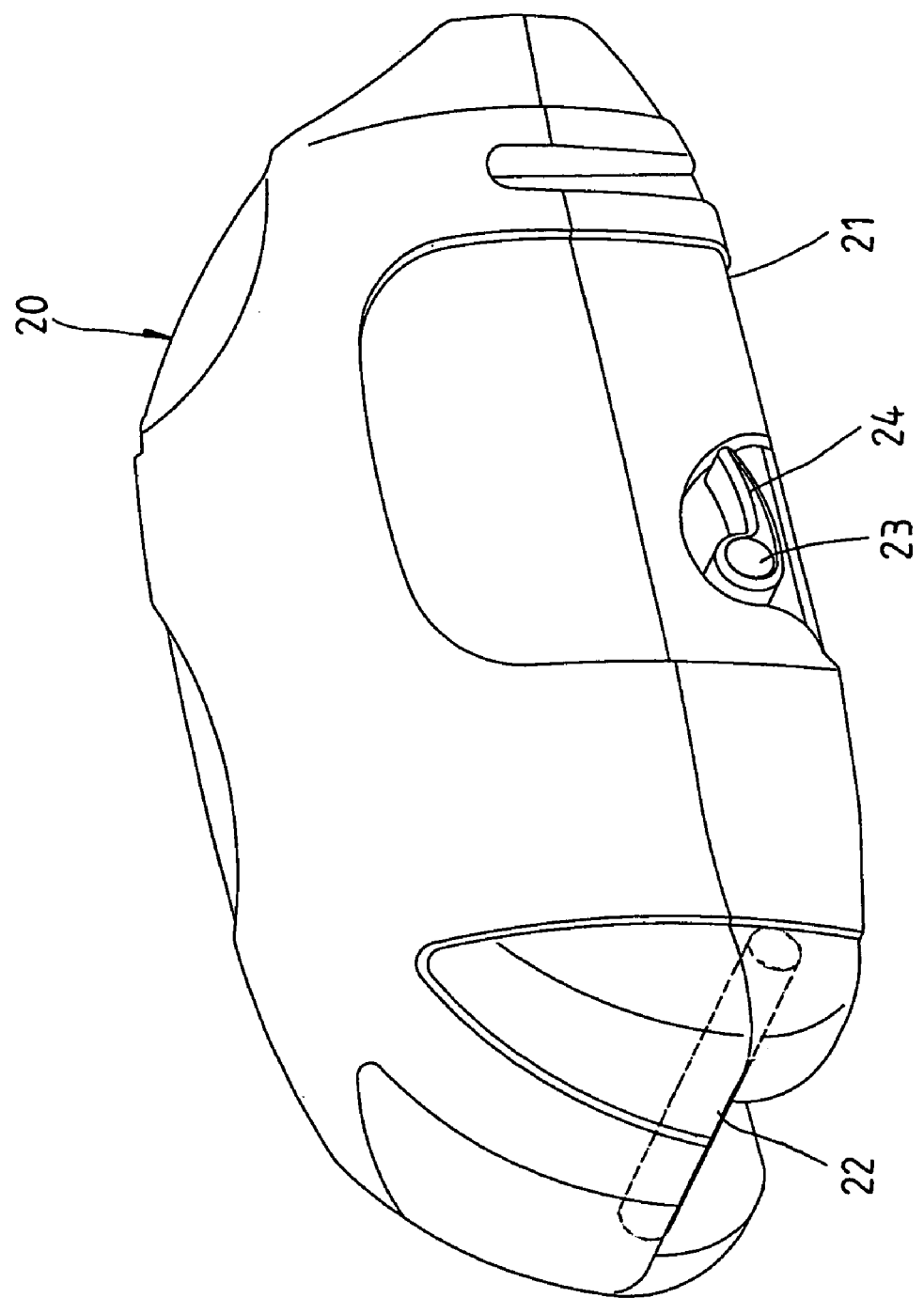
FIG. 1 illustrates the outer appearance of a power drive of the drive mechanism for use in a man-driven vehicle according to a preferred embodiment of the present invention.
Figure 2:
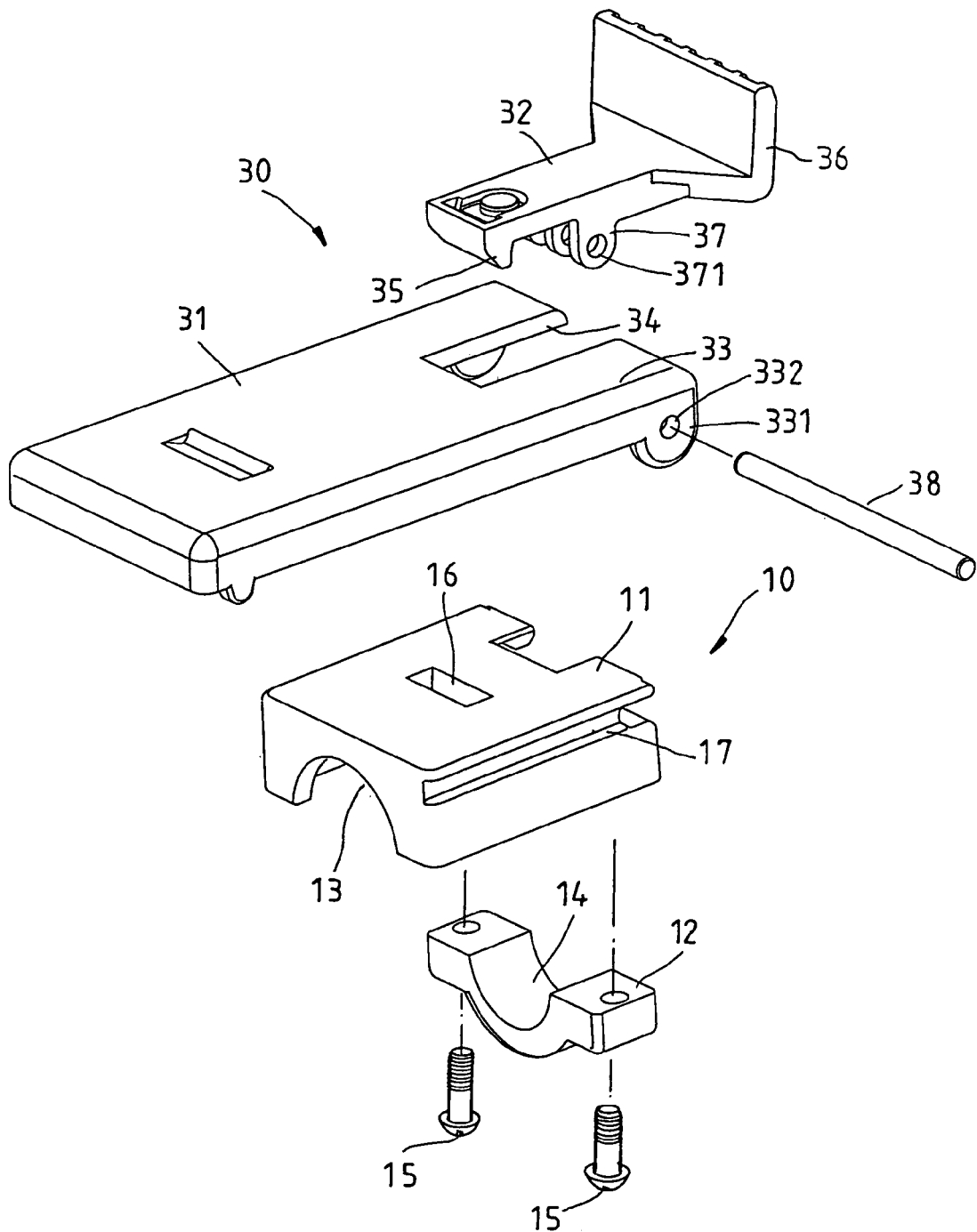
FIG. 2 is an exploded view of the rack and quick-release lock of the drive mechanism according to the preferred embodiment of the present invention.
Figure 3:
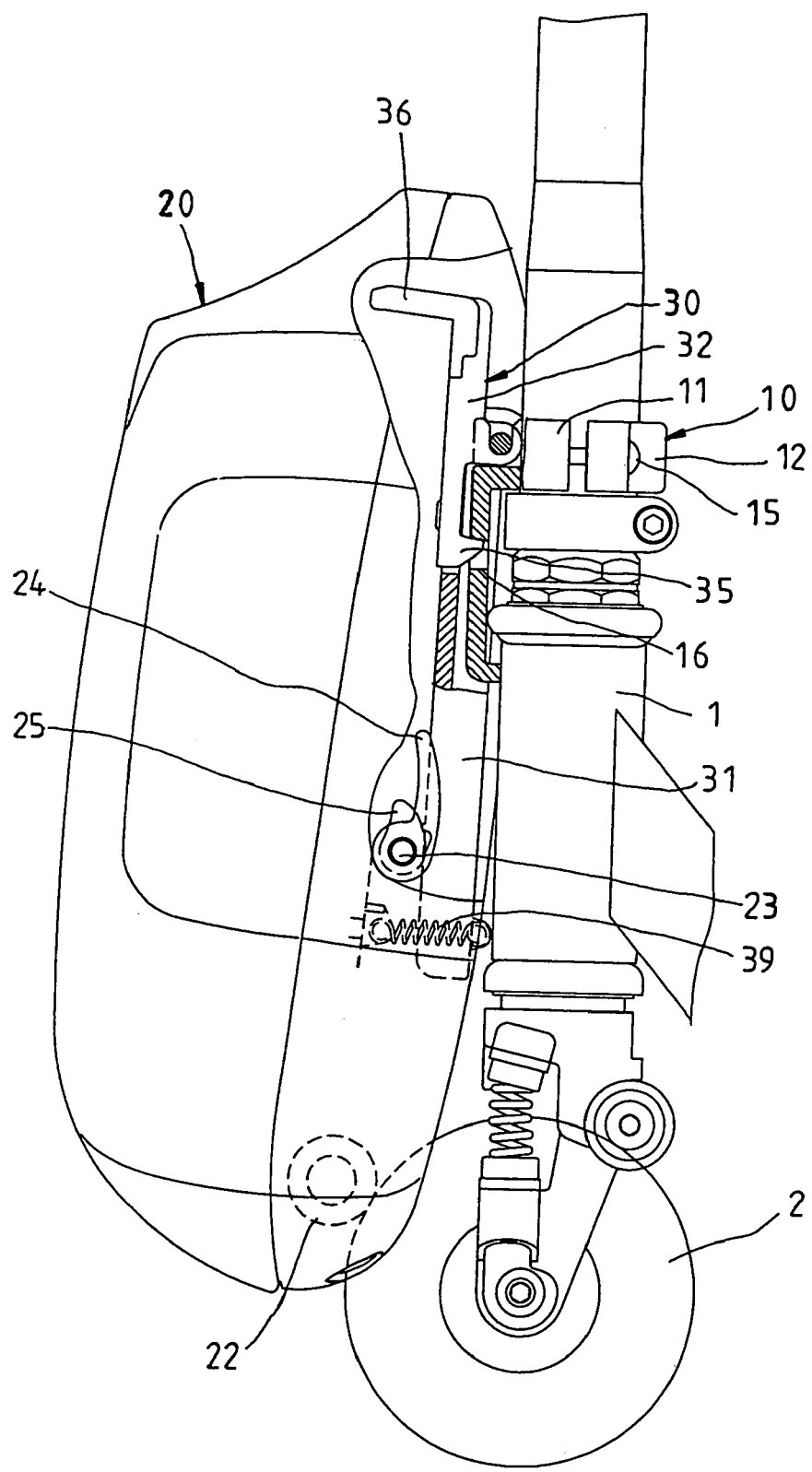
FIG. 3 is a schematic drawing showing the drive mechanism of the preferred embodiment of the present installed in the front fork of a kick scooter.

Referring to FIGS. 1~3, a drive mechanism in accordance with the present invention is shown installed in the front fork 1 of a man-driven vehicle, for example, a kick scooter, which front fork 1 has pivoted thereto a wheel 2. The drive mechanism comprises a rack 10, a power drive 20, and a quick-release lock 30.

The rack 10 comprises a base frame 11 and a constraint member 12. The base frame 11 has a longitudinally extended recessed mounting portion 13 of smoothly arched cross section attached to the front fork 1 at the top. The constraint member 12 has a longitudinally extended recessed mounting portion 14 of smoothly arched cross section attached to the front fork 1 at the bottom. Screws 15 are respectively bilaterally driven through the two ends of the constraint member 12 into the bottom wall of the base frame 11 at two sides of the longitudinally extended recessed mounting portions 13 and 14 to secure the rack 10 to the front fork 1. The base frame 11 further has two coupling grooves 17 longitudinally symmetrically formed in the two opposite vertical lateral sidewalls, and a vertical hook hole 16 through the top and bottom sidewalls across the longitudinally extended recessed mounting portion 13.

The power drive 20 comprises a mounting side 21 facing the front fork 1, a peripherally embossed transmission shaft 22 transversely fastened pivotally with the mounting side 21 at one side, a motor (not shown) mounted on the inside and coupled to the transmission shaft 22, and a battery set (not shown) mounted on the inside and electrically connected to the motor. The transmission shaft 22 can be pressed on the periphery of the wheel 2 for transferring a rotary driving force by means of friction. Therefore, when starting the motor, the transmission shaft 22 is driven to rotate the wheel 2. Further, a lever 23 is pivotally mounted on the mounting side 21. The lever 23 has a free end terminating in a handheld portion 24, and a projection 25 protruded from the body thereof.

The quick-release lock 30 comprises a flat base plate 31, and a locking member 32. The flat base plate 31 has a front coupling end 33, two lugs 331 bilaterally disposed in the front coupling end 33, and an opening 34 spaced between the lugs 331. The lugs 331 each have a pivot hole 332. The locking member 32 is insertable in the opening 34 of the flat base plate 31, having a hooked portion 35 transversely formed in the front side, a handle 36 located on the rear side, and parallel lugs 37 suspended from the bottom wall between the hooked portion 35 and the handle 36. The lugs 37 are transversely arranged in a line, each having a pivot hole 371. A pivot pin 38 is inserted through the pivot holes 332 of the lugs 331 of the flat base plate 31 and the pivot holes 371 of the lugs 37 of the locking member 32 to pivotally secure the quick-release lock 30 to the mounting side 21 of the power drive 20, keeping the flat base plate 31 stopped at the projection 25 of the lever 23. Further, a spring member 39 is connected between the mounting side 21 of the power drive 20 and the other end, namely, the rear end of the flat base plate 31.

Referring to FIG. 3 again, the rack 10 is directly fixedly fastened to the front fork 1. When installed, the user can move the handle 36 with the hands to engage the hooked portion 35 of the locking member 32 into the hook hole 16, for enabling the power drive 20 to drive the man-driven vehicle.

When wishing to select the man-driven operation mode or to remove the power drive 20 from the man-driven vehicle for charging the battery, press the handle 36 to turn the locking member 32 about the pivot pin 38 and to disengage the front hooked portion 35 of the locking member 32 from the hook hole 16 of the base frame 11 of the rack 10, for enabling the power drive 20 to be removed from the rack 10. Therefore, the loading/unloading of the power drive 20 is easy and quick.

Further, the flat base plate 31 has two coupling rails (not shown) longitudinally disposed in parallel at the bottom side and respectively coupled to the coupling grooves 15 of the base frame 11. The coupling between the coupling rails and the coupling grooves 15 ensure positive connection between the rack 10 and the quick-release lock 30.

Figure 4:
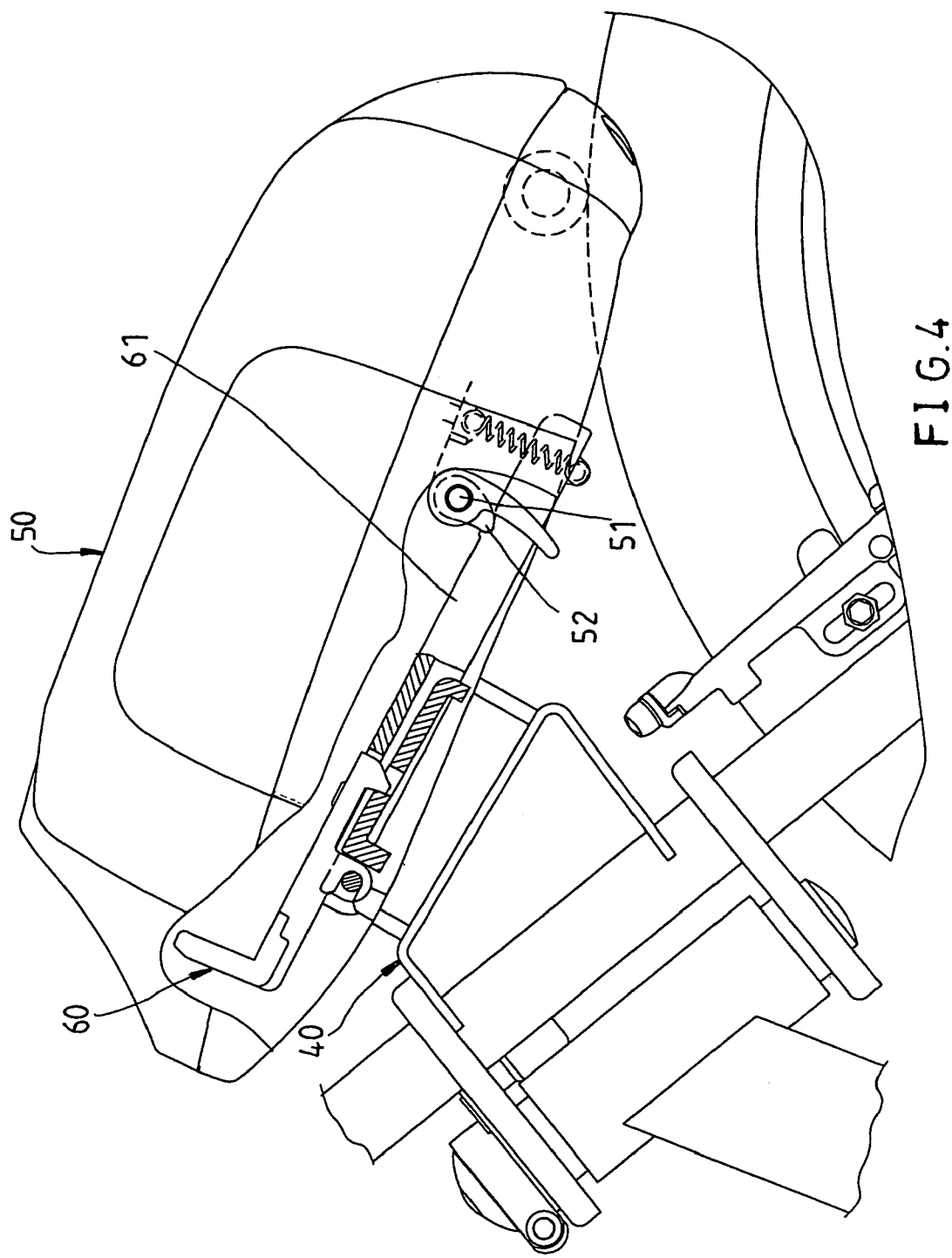
FIG. 4 is a schematic drawing showing the drive mechanism of the preferred embodiment of the present in an alternate form installed in a bicycle.

FIG. 4 shows an alternate form of the present invention. Similar to the aforesaid preferred embodiment, this embodiment is comprised of a rack 40, a power drive 50, and a quick-release lock 60. This alternate form is suitable for use in a relatively bigger scale man-driven vehicle, for example, a bicycle. The main features of this alternate form is the sloping design of the rack 40 and the relative positioning between the power drive 50 and the rack 40. The user can turn the lever 51 of the power drive 50, causing the protruded portion 52 of the lever 51 to lift one end of the flat base plate 61 of the quick-release lock 60 to further adjust the position of the angular position of the power drive 50 relative to the rack 40.

What is claimed is:

1. A drive mechanism for use in a man-driven vehicle having a front fork to which a wheel is rotatably connected, said drive mechanism comprising:

a rack affixed to the front fork of said man-driven vehicle;

a power drive having a transmission shaft pressable on a periphery of said wheel of said front work, and a power source coupled to said transmission shaft for driving said transmission shaft to rotate;

a quick-release lock coupled between said power drive and said rack for locking said power drive and said rack together; and wherein said quick-release lock comprises a flat base plate mounted in said power drive, and a locking member pivoted to said flat base plate for fastening said flat base plate to said rack.

2. The drive mechanism as claimed in claim 1, wherein said rack comprises a base frame and a constraint member fastened to said base frame by screws to affix said base frame to said front fork.

3. The drive mechanism as claimed in claim 1, wherein said power source comprises a motor and a battery set.

4. The drive mechanism as claimed in claim 1, wherein said transmission shaft has an embossed periphery.

5. The drive mechanism as claimed in claim 1, wherein said quick-release lock is mounted in said power drive.

6. The drive mechanism as claimed in claim 1, wherein said rack has a hook hole; said locking member comprises a hooked portion transversely located on one end thereof and hooking in the hook hole of said rack.

7. The drive mechanism as claimed in claim 6, wherein said locking member has a handle extended from one end thereof remote from said hooked portion.

8. The drive mechanism as claimed in claim 1, wherein said flat base plate is pivoted to said power drive; said power drive comprises a pivoted lever, said pivoted lever having an arched projection stopped at one side of said flat base plate.

* * * * *